(12) United States Patent
Colussi et al.

(10) Patent No.: US 8,356,620 B2
(45) Date of Patent: Jan. 22, 2013

(54) PRESSURE CONTROLLED THREE WAY VALVE DEVICE

(75) Inventors: Rafael A. Colussi, Santa Fe (AR); Nestor J. Vénica, Santa Fe (AR)

(73) Assignee: Col-Ven S.A., Santa Fe (AR)

( * ) Notice: Subject to any disclaimer, the term of this patent is extended or adjusted under 35 U.S.C. 154(b) by 62 days.

(21) Appl. No.: 13/003,555

(22) PCT Filed: Jul. 10, 2009

(86) PCT No.: PCT/IB2009/053017
§ 371 (c)(1),
(2), (4) Date: Mar. 16, 2011

(87) PCT Pub. No.: WO2010/004532
PCT Pub. Date: Jan. 14, 2010

(65) Prior Publication Data
US 2011/0162734 A1    Jul. 7, 2011

(30) Foreign Application Priority Data
Jul. 11, 2008   (AR) .............................. 20080103002

(51) Int. Cl.
*F16K 15/20* (2006.01)
(52) U.S. Cl. ........................................ 137/225; 137/226
(58) Field of Classification Search .................. 137/224, 137/225, 226; 152/415
See application file for complete search history.

(56) References Cited

U.S. PATENT DOCUMENTS

| | | | | |
|---|---|---|---|---|
| 1,156,328 A | * | 10/1915 | Thayer | 137/226 |
| 1,472,366 A | * | 10/1923 | Kelsey | 137/508 |
| 1,530,094 A | * | 3/1925 | Ryan | 137/225 |
| 1,584,934 A | * | 5/1926 | Harris | 137/225 |
| 4,895,199 A | | 1/1990 | Magnuson et al. | |

(Continued)

FOREIGN PATENT DOCUMENTS

| | | |
|---|---|---|
| DE | 20 2005 002485 U1 | 4/2006 |
| WO | WO 2010/004532 A1 | 1/2010 |

OTHER PUBLICATIONS

International Search Report dated Oct. 19, 2009, PCT/IB2009/053017.

*Primary Examiner* — John Rivell
*Assistant Examiner* — R. K. Arundale
(74) *Attorney, Agent, or Firm* — Edwards Wildman Palmer LLP; Howard M. Gitten

(57) ABSTRACT

A pressure-controlled three-way valve device for inflating, keeping inflated and deflating tires, the device having a plunger axially traversed by an inlet passage normally closed by a spring-urged inlet valve. The plunger's outer sidewall has a recess in which an O-ring extends to abut against the steps of the recess to limit the plunger stroke and keep an outlet circuit closed to a venting port formed in the sidewall of the body of the device. The plunger moving between a position to open air supply to the tire, a position to keep an outlet circuit to a tire closed and a position to open a venting port to deflate the tire. The plunger being mounted into the valve body by a diaphragm sealing an outer wall of the plunger against the valve body and permitting the moving of the plunger with minimal friction between the plunger and the valve body.

9 Claims, 3 Drawing Sheets

U.S. PATENT DOCUMENTS

| | | | |
|---|---|---|---|
| 4,938,272 A * | 7/1990 | Sandy et al. | 152/427 |
| 5,309,969 A * | 5/1994 | Mittal | 152/415 |
| 6,672,328 B2 | 1/2004 | Colussi et al. | |
| 7,021,326 B2 * | 4/2006 | Rogier | 137/226 |
| 7,089,953 B2 * | 8/2006 | Beau | 137/102 |
| 2002/0170597 A1 | 11/2002 | Colussi et al. | |

* cited by examiner

PRESSURE CONTROLLED THREE WAY VALVE DEVICE

CROSS REFERENCES TO RELATED APPLICATIONS

This application is a U.S. national phase application pursuant to 35 U.S.C. §371, of PCT/IB2009/053017 filed on Jul. 10, 2009, which claims priority to Argentine Patent Application No. 20080103002 filed on Jul. 11, 2008. The entire contents of the aforementioned patent applications are incorporated herein by these references.

BACKGROUND OF THE INVENTION

1. Field of the Invention

The present invention concerns a valve device for installation in pressurized gas or air piping and which may be controlled by means of the relative pressure of the gas applied to one port of the valve device or by the pressure differential between two ports, passages or circuits thereof. According to the invention, the state of the valve device may be remote-controlled via the air pressure in the pipe connected to that port, passage or circuit, without auxiliary control lines, by varying the air pressure applied to an end of the piping. In particular, it concerns a three-state valve device adapted to operatively adopt a closed position, an open position between one pair of ports or an open position between another pair of ports, according to the pressure state in one of the ports, i.e. a valve control port, with reduced friction between the valve components and more accurate and effective operation.

The valve device of the present invention may be applied to any pressurized installation where the pressure of the installation may be desired to be controlled, such as increased, released or decreased. Such an installation may be a circuit for pumping (inflating) and unpumping (deflating) pressurized loads, in particular as a valve for a tire, such as a component for a tire-pressure control system in a motor-car vehicle. Such systems are used in transport vehicles, especially lorries and buses, since they enable corrective action to be carried out, either automatically or via driver manual control means, on the inflation state of each tire and/or wheel axle without having to stop, thereby providing an important safety feature for transport.

In the mentioned application, the valve device is inserted, for example, between one end of the piping of the installation and the air input of the tire, replacing or applying it to the conventional valve of the wheel and provides for the three fundamental operations of the system, that is: to shut off the passage of air when the installation is underpressurized, to avoid the tires of the vehicle going flat, to enable sufficient air flow to pump a tire up or keep it inflated, in case of puncture for example, to avoid the vehicle having to stop anywhere, and to enable the tires to be deflated, for example for lowering the tire pressure because of road conditions.

In this application, the control port, which is coupled to one side of a plunger of the valve device, is connected to the piping. In addition to providing the state control pressure signal, at the same time it supplies the air (gas) for inflating; while a second port, coupled to an opposite side of the, plunger, is connected to the tire tube and the third port may be arranged as a vent for airing pressure from the second port.

2. Description of the Prior Art

A valve device of the type above mentioned is disclosed in the U.S. Pat. No. 6,672,328 to the same inventors of the present application and which is referred herein in its entirety as a reference.

U.S. Pat. No. 6,672,328 discloses a pressure-controlled three-way valve device of the type having a valve body 13 housing an inlet circuit or passage 15A extending longitudinally between two air ports 17A, 17C provided at respective longitudinally-opposite ends 19 of the valve body 13. The port 17A is for the inflow of inflating air. Accordingly, it is coupled to the pressurizing installation piping (not shown), from which it receives both the inflating airflow and pressure signals for controlling the valve device 11. The port 17C is coupled to the tire tube (not shown), such that it behaves as an inflating air inlet/deflating air outlet conduit. A port 178 is provided on one side of the valve body 13 to define a deflating air outlet port in communication with port 17C through an outlet circuit 15B. The valve body also houses a plunger 21 having a longitudinal stroke and urged by a spring towards the inlet port 17A end. The valve body also including an outlet valve which is closed at respective end positions of the plunger in a manner that the valve is open when the position of said plunger is in an intermediate range.

As it is disclosed in the cited US Patent, the outlet valve comprises a pair of circumferential steps 41A, 41B, formed in the outer wall surface of the plunger in order to define a recess which is in correspondence with a stationary seal or seat that is comprised of a sealing O-ring extending inwardly from the inner wall of the valve body and having a pair of circumferential sealing lips in correspondence with the cited steps in a manner that, en both end positions of the plunger stroke, one predetermined of the moving steps of the plunger seats against the corresponding lip thus closing the outlet circuit or passage which is open, through respective gaps formed between the lips and the steps, only when the plunger is at the intermediate position. The inlet passage 15A passes through the plunger and through a valve normally-closed by a piston 27 axially slidable within the valve body 13 and urged by spring 23 against a plunger end. In operation, the plunger is a movable seat for the inlet valve and a plurality of intermediate pressures are in charge of moving the plunger between its end positions to actuate the outlet valve.

An o-ring is mounted in the plunger in order to keep a sealing contact between the outer wall surface of the plunger and the inner wall surface of the valve body to guarantee an effective operation of the valve device. This device has shown satisfactory operation in several applications, however, this O-ring employed to prevent shortcircuits between the inlet circuit and the outlet circuit imposes a friction that offers an important resistance to the movement of the plunger to open the outlet/inlet valve. It is foreseen that, due to manufacturing tolerances, composition material, origin, aging, size variations due to lubricant effects, etc., of the O-ring, the calibration of the operation of the valve device may be affected, particularly in connection to the pressure rates controlling the opening of the outlet valve as well as the influence of foreign dirty and particulate material that can enter through the venting port.

In order to improve reliability and operation speed of the valve device, the average initial friction of the O-ring is compensated by adding a second spring or equivalent elastic means to provide a threshold force urging of the plunger towards the inlet valve having a piston or closing means moveably seated on the plunger. This spring is in opposition to the first spring urging the inlet valve against the plunger and is dimensioned to yield to the force of the latter absent enough air pressure at the inlet port and, at the same time, urge the plunger to recover faster in response to a control pressure signal at the inlet port. The above reference numbers are those employed in the specification of U.S. Pat. No. 6,672,328.

SUMMARY OF THE INVENTION

It is therefore an object of the invention to provide an improved three way valve device with the benefits of the above disclosed valve device but without the need of compensating the friction generated by the O-ring and with a better sensibility of the valve device, wherein the plunger of the new improved valve device is mounted in the valve body by means of an elastic member, such as a diaphragm, to replace the O-ring of the mentioned patent, to define a seal around the plunger and to urge the plunger naturally in a direction towards the inlet valve, wherein the plunger includes a moving seat, thus replacing the second spring of the patent, with the diaphragm being so dimensioned to yield upon lack of pressure from air or fluid, generally air or any fluid for the purpose of the present description, in the inlet port and to be capable of quickly restoring the position of the plunger upon the appearance of pressure signal in the inlet circuit.

It is another object of the invention to provide an improved three way valve device with a deformable means such as a diaphragm in replacement of a frictioning means such as an O-ring, with the diaphragm also reducing the risks of interferences in the proper operation of the valve due to impurities and particulate material always present in heavy lubricants.

It is still another object of the invention to provide an improved three way valve device with a deformable means such as a diaphragm that reduces the need of complying with the strict manufacturing tolerances necessary for an O-ring and with better sensitivity.

It is even another object of the invention to provide an improved three way valve device comprising a body comprised of several assembled parts providing a better construction and assembling with the provision of a filter to protect the valve components against the entrance of dust and particulate material through the venting port.

It is even another object of the invention to provide a pressure-controlled three-way valve device for inflating, keeping inflated and deflating tires, the device having a plunger axially traversed by an inlet passage normally closed by a spring-urged inlet valve. The plunger's outer sidewall has a recess in which an O-ring extends to abut against the steps of the recess to limit the plunger stroke and keep an outlet circuit closed to a venting port formed in the sidewall of the body of the device. The plunger moving between a position to open air supply to the tire, a position to keep an outlet circuit to a tire closed and a position to open a venting port to deflate the tire. The plunger being mounted into the valve body by a diaphragm sealing an outer wall of the plunger against the valve body and permitting the moving of the plunger with minimal friction between the plunger and the valve body.

It is yet another object of the invention to provide a pressure-controlled three-way valve device comprising:
a valve body,
an inlet circuit in said valve body, extended between an inlet port and a second port,
an outlet circuit in said valve body, extended between said second port and said outlet port;
a plunger housed in said inlet circuit and connected to first urging means that urges said plunger in a direction towards said inlet port, the plunger having a pair of seats comprising a pair of circumferential steps formed on the plunger outer wall surface;
an o-ring located between said steps and defining a pair of seals;
an outlet valve in said outlet circuit, said outlet valve comprising said pair of seals capable of alternatively abutting against said pair of steps upon moving of the plunger to at least three positions, a first position (FIG. 1) to communicate the inlet port with the outlet port, a second position (FIG. 2) to close communication between the outlet port, the second port and the inlet port, and a third position (FIG. 3) to communicate the outlet port with the second port, and
a diaphragm having a center part thereof sealably connected to the plunger and a periphery sealably retained in the valve body, whereby the diaphragm defines a seal between the plunger outer wall surface and the valve body at a position between the inlet port and the second port.

The above and other objects, features and advantages of this invention will be better understood when taken in connection with the accompanying drawings and description.

BRIEF DESCRIPTION OF THE DRAWINGS

These and other features and details of the subject matter of this invention and how it may be developed, implemented and put into practice may be better understood from the following detailed description of preferred embodiments illustrated in the attached drawings, wherein.

DESCRIPTION OF THE PREFERRED EMBODIMENTS

Figure 1:
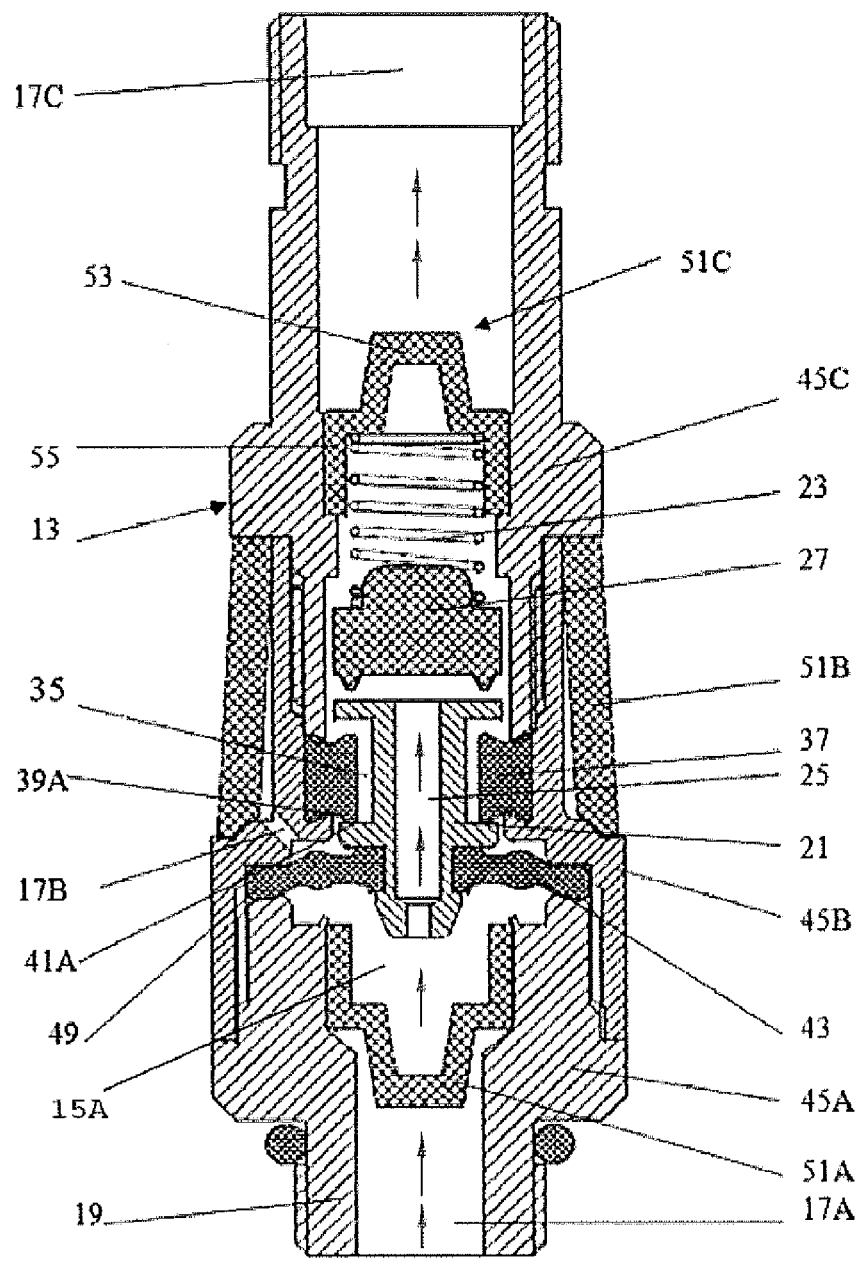
FIG. 1 shows a longitudinal cross-sectional view of the valve device according to a preferred embodiment of the present invention wherein the valve device is in the first position, namely an inflation position, to supply, for example, inflation air to a tire of a vehicle.

Now referring in detail to the invention, the same refers to a valve device for use in any installation where a pressure must be controlled. Any person skilled in the art would be capable of implying this valve in any such installation such as a pressurized circuit to keep the pressure of the tires of a vehicle under control.

The valve device according to the present invention comprises a valve body 13 housing an inlet circuit or inlet passage 15A extending longitudinally between two air ports, namely an inlet 17A and an outlet 17C provided at respective longitudinally opposite ends 19 of the valve body 13. Inlet port 17A is for the inflow of inflating air, therefore, it is coupled to the pressurizing installation piping (not shown), from which it receives both the inflating airflow and pressure signals for controlling the valve device 11. Outlet port 17C is coupled to the tire tube (not shown), such that it behaves as an inflating air inlet/deflating air outlet conduit. A second port 17B, venting port, is provided on one side of the valve body 13 to define a deflating air outlet port in communication with port 17C through an outlet circuit or outlet passage 15B.

The inside of the valve body houses a plunger 21 having a longitudinal stroke and urged by a spring 23 towards the inlet port 17A end. Plunger 21 is internally traversed by an axial passage 25 normally closed by an inlet valve comprising a piston 27 axially slidable within valve body 13 and urged by spring 23 against a plunger end. The piston has a circumferential lip 31 closing against end 33 of plunger 21, thus normally closing the outlet of the passage 25. Piston 27 does not seal against the side wall of the valve body 13 but rather features longitudinal slots allowing for gas flow, preferably air.

A circumferential recess 35 is provided on the outer surface of the plunger 21 in which an O-ring 37, arranged against the surface of the valve body 13 inner wall, extends laterally and inwards. This O-ring 37 also has a pair of circumferential lips 39A, 39B in respective correspondence with the pair of steps, namely inner step 41A, and outer step 41B, defined by recess 35. Thus, the stroke of the plunger 21 is limited by steps 41A and 41B alternatively abutting against lips 39A, 39B.

According to the improvements provided by the present invention, between the lower end of plunger 21 and second port or venting port 17b, a diaphragm 43 is mounted. Diaphragm 43 may be made of any suitable elastic material such as rubber, and has a center part thereof connected and sealed to the plunger at a recess 44 in a section of the plunger below inner step 41A of the plunger. Diaphragm 43 also has a periphery sealably retained in the valve body, whereby the diaphragm defines a seal between the plunger outer wall surface and the valve body at a position between the inlet port 17A and the second port 17B. Thus, diaphragm 43 seals any probable pass between port 17B and port 17A between plunger 21 and the inner wall surface of valve body 13. In this manner, diaphragm 43 not only guarantees a seal but also permit plunger 21 to remain centered in a resting point when the pressures at post 17A and 17C are equalized. Diaphragm 43 also keeps plunger 21 at a position that o-ring 37 remains equidistant relative steps 41A and 41B in the venting position shown in FIG. 3.

Also according to the invention, body 13 is comprises of three valve pieces, namely a first valve piece 45A, a second intermediate piece 45B and a third valve piece 45C, wherein piece 45B is connected, preferably by thread connection, to pieces 45A and 45C. First valve piece 45A includes inlet port 17A, second intermediate valve piece 45B includes second port 17b and third valve piece 45C is to be connected to a tire circuit. Second port 17B is covered by a filter 51 that is preferably a truncated cone filter mounted around said second intermediate valve piece and retained between the second intermediate valve piece and the third valve piece. Diaphragm 43 has a periphery thereof, preferably of increased thickness, sealably retained between the first valve piece and the second intermediate valve piece. and o-ring 37 is sealably retained between the third valve piece and the second intermediate valve piece.

Ports 17A and 17C may also be provided with corresponding filters 51A, 51C in order to prevent the entrance of any dust or particulate material that could affect the valve components. Filters 51A, 51C may comprise any foraminous material to permit the pass of air. Filters 51A, 51 C may also have a design with a step or ring 55 to form a seat for spring 23, Operation:

To inflate the tire, with the valve device in the position shown in FIG. 1, pressurized air is applied to the inlet port 17A, at a pressure sufficiently exceeding the tire pressure at port 17C to push plunger 21 against the spring 23, deforming diaphragm 43, until step 41A abuts against lip 39A of seal 37, thus keeping the air passage to the venting port 17B closed. Plunger 21 stops at this stroke limit, but the air pressure in inlet port 17A acts on piston 27 until the spring 23 yields to open passage 25, thus enabling the tires to be inflated.

Thus, a drop in tire pressure, for example as a result of a flat tire, causes a positive pressure differential generating a net resultant on plunger 21 in the direction to port 17C, sufficient for the spring 23 to yield and fully open the inlet circuit or passage 15A, as shown in FIG. 1.

Figure 2:
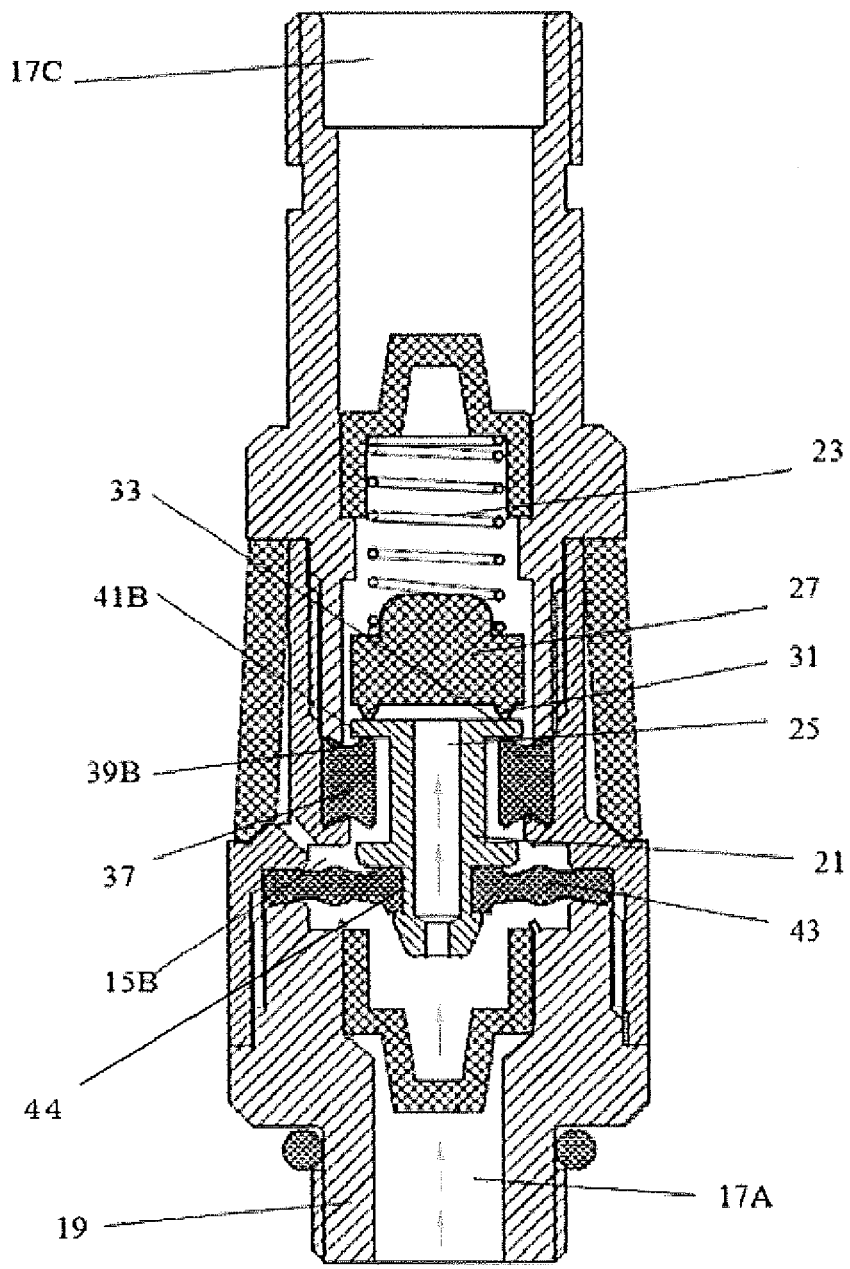
FIG. 2 shows a longitudinal cross-sectional view of the valve device of FIG. 1 wherein the valve device is in the second position position, namely the closed position, to keep the pressure in the tires.

The device of the invention is designed in anticipation of a possible breakdown or fault in the installation, in which case the valve device 11 automatically closes during any depressurization of the piping or installation. Therefore, as shown in FIG. 2, in the absence of air pressure in inlet port 17A, spring 23 urges the valve piston 27 against the plunger 21, thus closing the passage 25, as well as the plunger 21 to its limit position in the direction to inlet port 17A, thus elastically deforming diaphragm 43 in the other sense, whereby the other step 41B abuts against the other lip 39B of seal 37, thus closing the air flow through the deflation circuit 15B, that is isolating venting port 17B from port 17C coupled to the tire, the three ports of the valve thus remaining blocked.

Figure 3:
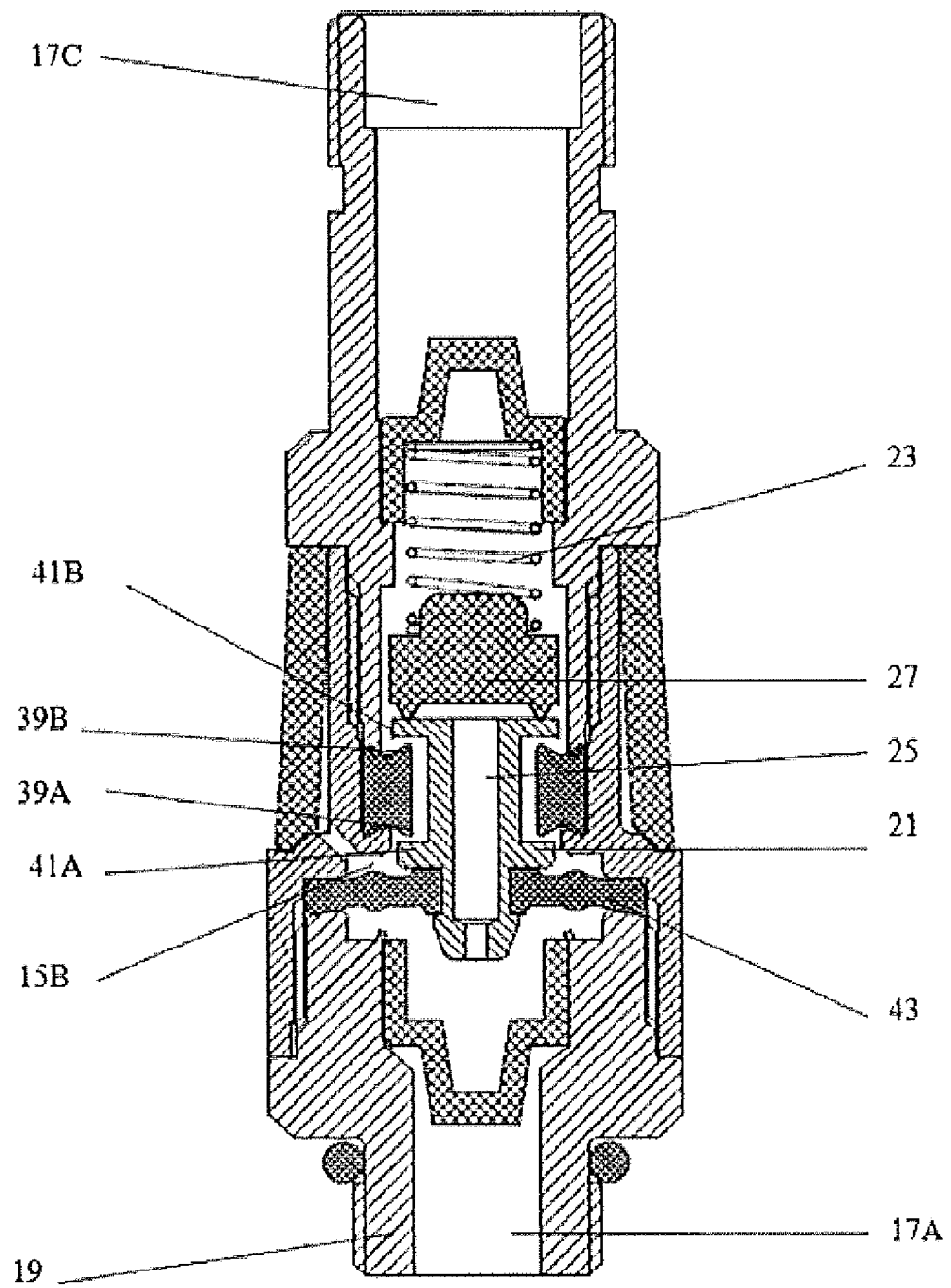
FIG. 3 shows a longitudinal cross-sectional view of the valve device of FIG. 1 wherein the valve device is in the third position, namely in the deflating position, to permit the escape of pressurized air from a tire.

In the event the vehicle's driver takes the decision of reducing the pressure in the tire, the driver should first depressurize the piping, depriving the inlet port 17A of air pressure and ensuring the momentary blocking of all the vehicle tires. Then, the pressure of the tire may be increased to reach the desired tire calibration pressure. As shown in FIG. 3, plunger 21 is then urged to an intermediate position wherein respective gaps are opened between both assemblies of lip 39A and step 41A, as well as lip 39B and step 41B, so that air vents through passage 15B towards outlet port 17B.

According to the improvement of the present invention, a switch from inflation to deflation status is achieved with lower pressure at the inlet of the valve. For example, with the inventive improved valve device the switching is obtained by applying a pressure of 640 kPa (93 psi) at inlet 17A with a pressure of 690 kPa (100 psi) in the tire. With the valve device of U.S. Pat. No. 6,672,328, both pressures must be equalized to switch such status. This is an advantage in the event that any tire has a lower calibrated pressure, when the tire is punctured or flat for example, because the remaining tires do not lose excessive air pressure during the switching as occurred in the prior art valve devices.

As explained in U.S. Pat. No. 6,672,328, the position of plunger 21 depends on the pressure relationship between the valve inlet and the tire, with an intermediate value wherein the plunger is urged to an intermediate position where venting circuit 15B and venting port 17B remain open. Thus, the operation is based in the principle that plunger 21 is a moving seat for inlet valve or valve piston 27, thus generating a range of intermediate pressures within which the longitudinal stroke of plunger 21 is employed as an outlet valve. Diaphragm 43 reduces the dissipative effects from the necessary connection between plunger 21 and the inner wall of valve body 13.

While preferred embodiments of the present invention have been illustrated and described, it will be obvious to those skilled in the art that various changes and modifications may be made therein without departing from the scope of the invention as defined in the appended claims.

We claim:

1. A pressure-controlled three-way valve device comprising:
   a valve body,
   an inlet circuit in said valve body, extended between an inlet port (17A) and a second port (17B),
   an outlet circuit (15B) in said valve body, extended between said second port (17B) and an outlet port (17C);
   a plunger (21) housed in said inlet circuit and connected to a first urging means (23) that urges said plunger in a direction towards said inlet port (17A), the plunger having a pair of seats comprising a pair of circumferential steps (41A, 41B) formed on the plunger outer wall surface;

an o-ring (37) located between said steps and defining a pair of seals (39A, 39B);

an outlet valve in said outlet circuit (15B), said outlet valve comprising said pair of seals capable of alternatively abutting against said pair of steps upon moving of the plunger to at least three positions, a first position to communicate the inlet port with the outlet port, a second position to close communication between the outlet port, the second port and the inlet port, and a third position to communicate the outlet port with the second port, and a diaphragm (43) having a center part thereof sealably connected to the plunger and a periphery sealably retained in the valve body, whereby the diaphragm defines a seal between the plunger outer wall surface and the valve body at a position between the inlet port (17A) and the second port (17B), wherein the diaphragm naturally urges said plunger to rest at an intermediate position between the first and second positions.

2. The valve device of claim 1, wherein the diaphragm is made of an elastic material.

3. The valve device of claim 1, wherein, said pair of circumferential steps (41A, 41B) define an inner step and an outer step, and the diaphragm is connected to the plunger at a section of the plunger below the inner step of the plunger.

4. The valve device of claim 1, wherein the valve body comprises a first valve piece including said inlet port, a second intermediate valve piece including said second port and connected to said first valve piece, and a third valve piece connected to said second intermediate valve piece.

5. The valve device of claim 4, wherein the periphery of the diaphragm is sealably retained between the first valve piece and the second intermediate valve piece.

6. The valve device of claim 4, wherein said o-ring is sealably retained between the third valve piece and the second intermediate valve piece.

7. The valve device of claim 4, wherein the second port is a venting port.

8. The valve device of claim 7, wherein the venting port is covered by a filter.

9. The valve device of claim 8, wherein the filter covering the venting port is a truncated cone filter mounted around said second intermediate valve piece and retained between the second intermediate valve piece and the third valve piece.

\* \* \* \* \*